US011384810B2

(12) United States Patent
Mohammadi

(10) Patent No.: US 11,384,810 B2
(45) Date of Patent: Jul. 12, 2022

(54) DAMPER WITH TWO-PIECE SHELL

(71) Applicant: Tenneco Automotive Operating Company Inc., Lake Forest, IL (US)

(72) Inventor: Amirahmad Mohammadi, Heverlee (BE)

(73) Assignee: Tenneco Automotive Operating Company Inc., Lake Forest, IL (US)

(*) Notice: Subject to any disclaimer, the term of this patent is extended or adjusted under 35 U.S.C. 154(b) by 307 days.

(21) Appl. No.: 16/166,505

(22) Filed: Oct. 22, 2018

(65) Prior Publication Data
US 2020/0124129 A1 Apr. 23, 2020

(51) Int. Cl.
*F16F 9/32* (2006.01)
*B23K 31/02* (2006.01)
(Continued)

(52) U.S. Cl.
CPC ............ *F16F 9/3257* (2013.01); *B21D 22/02* (2013.01); *B23K 26/24* (2013.01); *B23K 26/38* (2013.01); *B23K 31/027* (2013.01); *F16F 9/10* (2013.01); *B23K 2101/06* (2018.08); *B23K 2103/04* (2018.08); *F16F 2226/047* (2013.01); *F16F 2226/048* (2013.01)

(58) Field of Classification Search
CPC ...... F16F 9/3257; F16F 9/1038; F16F 9/3271; F16F 9/325; F16F 9/3242; F16F 226/048; B23K 31/027; B23K 26/24; B23K 26/38; B23K 2101/06; B21D 22/02
See application file for complete search history.

(56) References Cited

U.S. PATENT DOCUMENTS 3,762,448 A 10/1973 Donohue
4,241,843 A * 12/1980 Walker ................ B65D 90/046
220/4.12
(Continued)

FOREIGN PATENT DOCUMENTS

DE 102009008337 A1 8/2010
DE 102011051057 A1 9/2012
(Continued)

OTHER PUBLICATIONS

International Search Report and Written Opinion issued in related PCT/US2019/057127 dated Feb. 7, 2020.

*Primary Examiner* — Christopher M Koehler
(74) *Attorney, Agent, or Firm* — Harness, Dickey & Pierce, P.L.C.

(57) ABSTRACT

A shock absorber pressure tube defining a working chamber is provided. A piston assembly coupled to a piston rod is slidably disposed in the pressure tube and divides the working chamber into upper and lower working chambers. A reserve tube surrounds the pressure tube to define a reserve chamber. A base valve assembly, position at one end of the pressure tube, controls fluid flow between the lower working chamber and the reserve chamber. The reserve tube comprises first and second open shells that are joined together at longitudinal seams to create a substantially cylindrical shape. The first and second open shells may be made from patchwork blanks, tailor welded blanks, tailor rolled blanks, or tailor heat treated blanks to give different portions of the first and second open shells different thicknesses, strengths, properties, or characteristics.

19 Claims, 14 Drawing Sheets

(51) Int. Cl.
*B21D 22/02* (2006.01)
*B23K 26/24* (2014.01)
*F16F 9/10* (2006.01)
*B23K 26/38* (2014.01)
*B23K 101/06* (2006.01)
*B23K 103/04* (2006.01)

(56) References Cited

U.S. PATENT DOCUMENTS

| | | | |
|---|---|---|---|
| 4,669,586 A | 6/1987 | Mettler | |
| 5,353,898 A * | 10/1994 | Handke | F16F 9/325 |
| | | | 188/318 |
| 5,441,132 A | 8/1995 | Pradel et al. | |
| 5,483,733 A * | 1/1996 | Hoffman | A01D 34/90 |
| | | | 29/463 |
| 6,283,259 B1 * | 9/2001 | Nakadate | F16F 9/369 |
| | | | 188/322.2 |
| 7,451,541 B2 * | 11/2008 | Stastny | F16L 9/17 |
| | | | 138/157 |
| 8,141,404 B2 | 3/2012 | Newport et al. | |
| 8,459,620 B2 | 6/2013 | Thorpe | |
| 2006/0196032 A1 * | 9/2006 | Schmidt | F16L 9/22 |
| | | | 29/455.1 |
| 2007/0132307 A1 * | 6/2007 | Fahrentholz | B60B 35/16 |
| | | | 301/137 |
| 2010/0230157 A1 * | 9/2010 | Sakata | B60R 16/0215 |
| | | | 174/72 A |
| 2013/0312865 A1 * | 11/2013 | Baur | F16L 9/18 |
| | | | 138/148 |
| 2014/0231200 A1 * | 8/2014 | Katayama | F16F 9/325 |
| | | | 188/314 |
| 2015/0377315 A1 | 12/2015 | Gunther et al. | |
| 2016/0115975 A1 * | 4/2016 | Oberender | F16F 9/38 |
| | | | 92/117 A |
| 2017/0175840 A1 | 6/2017 | Rolleke et al. | |
| 2019/0368568 A1 * | 12/2019 | Muraguchi | F16F 9/3257 |

FOREIGN PATENT DOCUMENTS

| | | |
|---|---|---|
| EP | 0889258 A1 | 1/1999 |
| EP | 1818564 A2 | 8/2007 |
| EP | 2786836 A1 | 10/2014 |
| JP | H04158946 A | 6/1992 |
| JP | H0775843 A | 3/1995 |
| JP | H1113814 A | 1/1999 |
| JP | 2018118284 A | 8/2018 |
| KR | 101325742 B1 | 11/2013 |

* cited by examiner

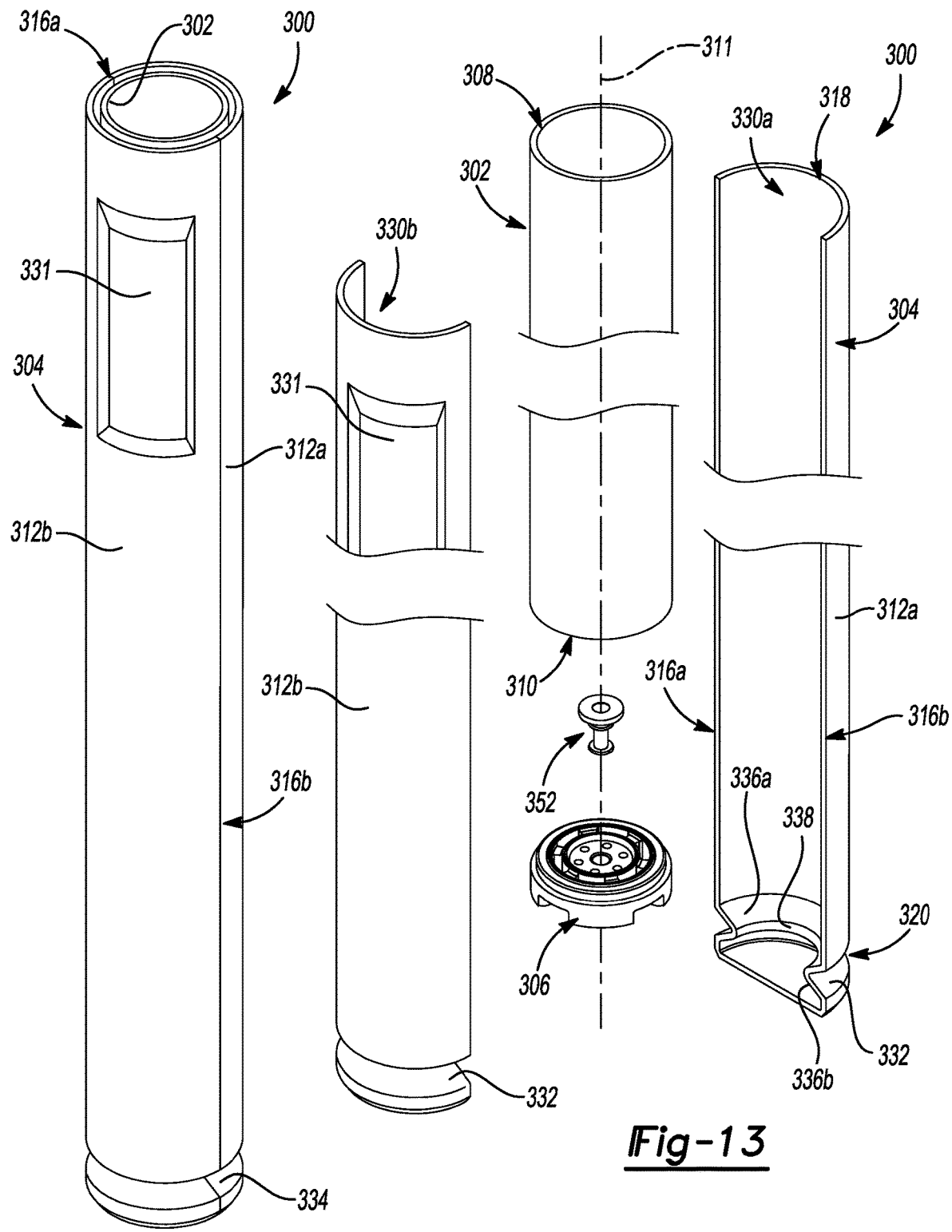

DAMPER WITH TWO-PIECE SHELL

FIELD

The present disclosure relates to a hydraulic damper or shock absorber adapted for use in a suspension system such as the suspension systems used for automotive vehicles. More particularly, the present disclosure relates to a hydraulic damper or shock absorber having a reserve tube made of a two-piece shell.

BACKGROUND

The statements in this section merely provide background information related to the present disclosure and may not constitute prior art.

In general, dampers are installed alongside a spring (as a stand-alone shock absorber) or inside a spring (as part of a coil-over shock and strut assembly) and placed in front and rear suspension systems. They are used to absorb and dissipate the impact and rebound movement of the vehicle's suspension system, and keep the vehicle's tires in contact with the ground. The shock absorber is installed to the vehicle frame by an upper mount and to the suspension by a lower mount with a loop or U-bracket. Different sheet metal formed components such as a stabilization bracket, foot, spring seat, or external valve housing may need to be welded/joined to the seamless tube forming the outside of the shock absorber.

A conventional hydraulic damper or shock absorber comprises a cylinder which is adapted at one end for attachment to the sprung or unsprung mass of a vehicle. A piston is slidably disposed within the cylinder with the piston separating the interior of the cylinder into two fluid chambers. A piston rod is connected to the piston and extends out of one end of the cylinder where it is adapted for attachment to the other of the sprung or unsprung mass of the vehicle. A first valving system, typically incorporated within the piston, functions to create a damping load during the shock absorber's extension stroke of the piston with respect to the cylinder. A second valving system, typically incorporated within the piston in a mono-tube design and in a base valve assembly in a dual-tube design, functions to create a damping load during the shock absorber's compression stroke of the piston with respect to the cylinder.

SUMMARY

This section provides a general summary of the disclosure, and is not a comprehensive disclosure of its full scope or all of its features.

A shock absorber according to the present disclosure includes a pressure tube defining a working chamber. A piston assembly coupled to a piston rod is slidably disposed in the pressure tube and divides the working chamber into an upper working chamber and a lower working chamber. A reserve tube surrounds the pressure tube to define a reserve chamber. A base valve assembly, positioned at one end of the pressure tube, controls fluid flow between the lower working chamber and the reserve chamber to accommodate for changes in the fluid volume displaced by the length of the piston rod positioned inside the upper working chamber. The base valve alone, or in combination with an externally mounted control valve, generates different pressure flow characteristics for the shock absorber, which controls the damping characteristics for the shock absorber.

In accordance with several aspects of the present disclosure, the reserve tube is comprised of first and second open shells that are joined together at longitudinal seams to create a substantially cylindrical shape. The first and second open shells may be made from patchwork blanks, tailor welded blanks, tailor rolled blanks, or tailor heat treated blanks to give different portions of the first and second open shells different thicknesses, strengths, properties, or characteristics. The first and second open shells may optionally include various features such as a flanged end, a cupped base, a planar portion creating a bracket, and one or more circumferentially extending notches for supporting the base valve assembly within one end of the reserve tube.

In accordance with other aspects of the present disclosure, a method for manufacturing a shock absorber from two open shells is provided. The method includes the steps of obtaining a pressure tube and slidably positioning a piston assembly within the pressure tube. The method also includes the steps of forming a first open shell from a first metal sheet and forming a second open shell from a second metal sheet. The method proceeds with the steps of positioning the first open shell and the second open shell around the pressure tube, aligning the first open shell with the second open shell, and welding the first open shell to the second open shell to sealingly join the first open shell to the second open shell and thereby define a reserve tube. The method further includes the step of coupling the reserve tube to the pressure tube. In accordance with these steps, the reserve tube is formed to include a substantially cylindrically-shaped portion and a protrusion that is at least partially defined by one of the first metal sheet and the second metal sheet.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 12 is a front perspective view of another exemplary pressure tube, reserve tube, and base valve sub-assembly constructed in accordance with the present disclosure;

FIG. 13 is an exploded perspective view of the pressure tube, reserve tube, and base valve sub-assembly illustrated in FIG. 12;

DETAILED DESCRIPTION

Figure 1:
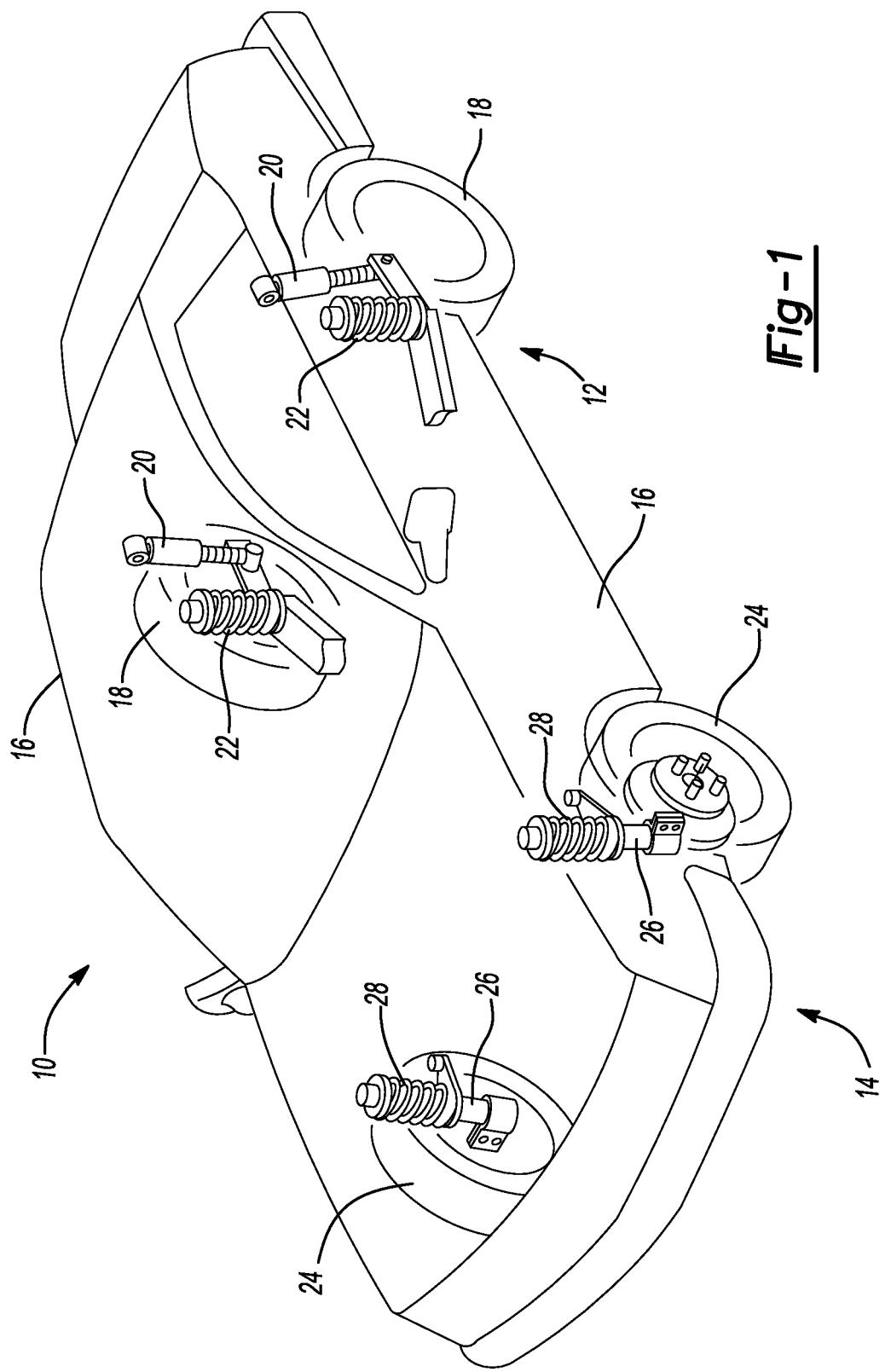
FIG. 1 illustrates an automotive vehicle, which incorporates shock absorbers in accordance with the present disclosure.

The following description is merely exemplary in nature and is not intended to limit the present disclosure, application, or uses. Referring now to the drawings in which like reference numerals designate like components throughout the several views, suspension components of a vehicle 10 are illustrated.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates the suspension system of vehicle 10. The vehicle 10 includes a rear suspension 12, a front suspension 14, and a body 16. The rear suspension 12 has a transversely extending rear axle assembly (not shown) adapted to operatively support a pair of rear wheels 18. The rear axle is attached to body 16 by a pair of shock absorbers 20 and by a pair of springs 22. Similarly, the front suspension 14 includes a transversely extending front axle assembly (not shown) to operatively support a pair of front wheels 24. The front axle assembly is attached to body 16 by a pair of shock absorbers 26 and by a pair of springs 28, which are configured in a coil-over arrangement with the pair of shock absorbers 26. Shock absorbers 20 and 26 dampen the relative motion of the unsprung portion (i.e., front and rear suspensions 12, 14) with respect to the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus will include McPherson struts and other damper designs known in the art.

Figure 2:
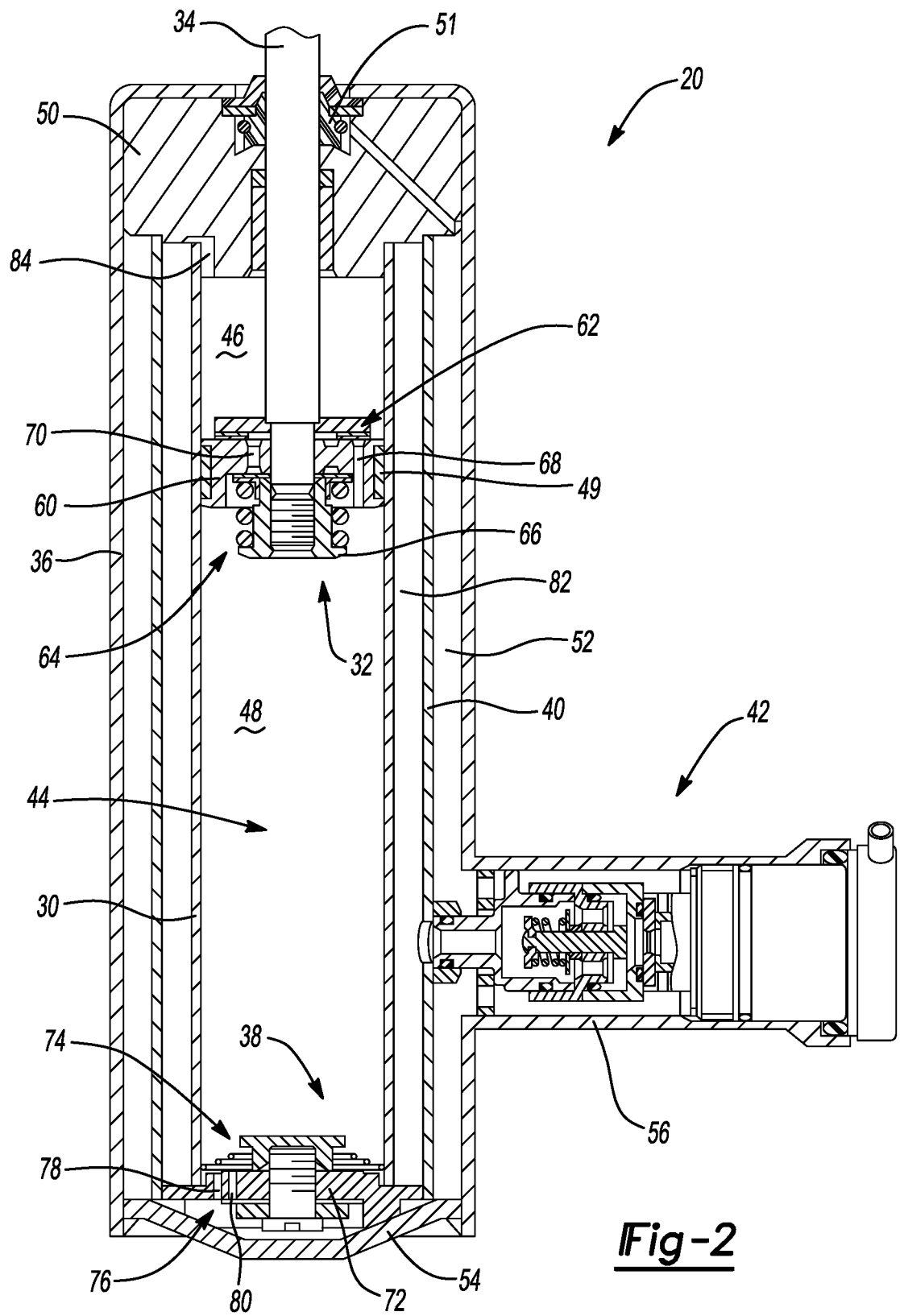
FIG. 2 is a side cross-sectional view of one of the exemplary shock absorbers illustrated in FIG. 1.

Referring now to FIG. 2, shock absorber 20 is shown in greater detail. While FIG. 2 illustrates only shock absorber 20, it is to be understood that shock absorber 26 also includes the design described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reserve tube 36, a base valve assembly 38, an intermediate tube 40, and an externally mounted control valve 42.

Pressure tube 30 defines a working chamber 44. The piston assembly 32 is slidably disposed within pressure tube 30 and divides working chamber 44 into an upper working chamber 46 and a lower working chamber 48. A seal 49 is disposed between piston assembly 32 and pressure tube 30 to permit sliding movement of piston assembly 32 with respect to pressure tube 30 without generating undue frictional forces as well as sealing the upper working chamber 46 from the lower working chamber 48. The piston rod 34 is attached to the piston assembly 32 and extends through the upper working chamber 46 and through an upper rod guide assembly 50, which closes the upper ends of the pressure tube 30 and the intermediate tube 40. A seal assembly 51 seals the interface between the upper rod guide assembly 50 and the piston rod 34. The end of piston rod 34 opposite to piston assembly 32 is adapted to be secured to the sprung mass of vehicle 10. Because piston rod 34 extends only through the upper working chamber 46 and not the lower working chamber 48, extension and compression movements of the piston assembly 32 with respect to the pressure tube 30 causes a difference in the amount of fluid displaced in the upper working chamber 46 compared to the amount of fluid displaced in the lower working chamber 48. The difference in the amount of fluid displaced is known as the "rod volume" and during extension movements it flows through the base valve assembly 38. During a compression movement of the piston assembly 32 with respect to pressure tube 30, valving within the piston assembly 32 allows fluid to flow from the lower working chamber 48 to the upper working chamber 46 while the "rod volume" of fluid flow flows through the control valve 42.

Reserve tube 36 surrounds pressure tube 30 to define a fluid reserve chamber 52 located between tubes 36 and 40. The bottom end of reserve tube 36 is closed by a base cup 54, which is adapted to be connected to the unsprung mass of vehicle 10. The upper end of reserve tube 36 is attached to upper rod guide assembly 50. The reserve tube 36 includes a tubular extension 56 that extends radially outwardly away from the pressure tube 30. The control valve 42 is housed within the tubular extension 56 of the reserve tube 36.

Base valve assembly 38 is disposed between the lower working chamber 48 and the reserve chamber 52 to control the flow of fluid from the reserve chamber 52 to the lower working chamber 48. When shock absorber 20 extends in length, an additional volume of fluid is needed in the lower working chamber 48 due to the rod volume. Thus, fluid will flow from the reserve chamber 52 to the lower working chamber 48 through base valve assembly 38. When shock absorber 20 compresses in length, an excess of fluid must be removed from the lower working chamber 48 due to the rod volume. Thus, fluid will flow from the lower working chamber 48 to the reserve chamber 52 through control valve 42.

Piston assembly 32 comprises a piston body 60, a first compression valve assembly 62, and a first extension valve assembly 64. A nut 66 is threaded onto the piston rod 34 to secure the first compression valve assembly 62, the piston body 60, and the first extension valve assembly 64 to the piston rod 34. Piston body 60 defines a first plurality of compression passages 68 and a first plurality of extension passages 70. Base valve assembly 38 comprises a valve body 72, a second extension valve assembly 74, and a second compression valve assembly 76. Valve body 72 defines a second plurality of extension passages 78 and a second plurality of compression passages 80.

During a compression stroke, fluid in the lower working chamber 48 is pressurized causing fluid pressure to react against the first compression valve assembly 62. The first compression valve assembly 62 therefore acts as a check valve between the lower working chamber 48 and the upper working chamber 46. The damping characteristics of the shock absorber 20 during a compression stroke are controlled by either the control valve 42 alone or by the control valve 42 working in parallel with the base valve assembly 38. The second compression valve assembly 76 controls the flow of fluid from the lower working chamber 48 to the reserve chamber 52 during a compression stroke. The second compression valve assembly 76 can be designed as a safety hydraulic relief valve, a damping valve working in parallel with the control valve 42, or the second compression valve assembly 76 can be removed altogether from base valve assembly 38. During an extension stroke, the first plurality of compression passages 68 are closed by the first compression valve assembly 62.

During an extension stroke, fluid in the upper working chamber 46 is pressurized causing fluid pressure to react against the first extension valve assembly 64. The first extension valve assembly 64 is designed as either a safety hydraulic relief valve, which will open when the fluid pressure within the upper working chamber 46 exceeds a predetermined limit, or as a pressure valve working in parallel with control valve 42 to change the shape of the damping curve. The damping characteristics of the shock absorber 20 during an extension stroke are controlled by either the control valve 42 alone or by control valve 42 working in parallel with the first extension valve assembly 64. Replacement flow of fluid into the lower working chamber 48 during an extension stroke flows through the base valve assembly 38. Fluid in the lower working chamber 48 is reduced in pressure causing fluid pressure in the reserve chamber 52 to open the second extension valve assembly 74, which allows fluid to flow from the reserve chamber 52 to the lower working chamber 48 through the second plurality of extension passages 78. The second extension valve assembly 74 therefore acts as a check valve between the reserve chamber 52 and the lower working chamber 48. The damping characteristics of the shock absorber 20 during an extension stroke are controlled by either the control valve 42 alone or by the first extension valve assembly 64 working in parallel with the control valve 42.

Intermediate tube 40 engages the upper rod guide assembly 50 on an upper end and engages the base valve assembly 38 on a lower end. An intermediate chamber 82 is defined between intermediate tube 40 and pressure tube 30. A passage 84 is formed in upper rod guide assembly 50 for fluidly connecting upper working chamber 46 and intermediate chamber 82. The control valve 42 controls fluid flow between the intermediate chamber 82 and the reserve chamber 52. During a compression stroke of the shock absorber 20, fluid in the upper working chamber 46 can flow into the intermediate chamber 82 through passage 84 and then into the reserve chamber 52 as permitted by the control valve 42 to accommodate for the increase in rod volume in the upper working chamber 46. During an extension stroke of the shock absorber 20, fluid in the reserve chamber 52 flows through the base valve assembly 38 and into the lower working chamber 44 to replace the lost rod volume.

Figure 3:
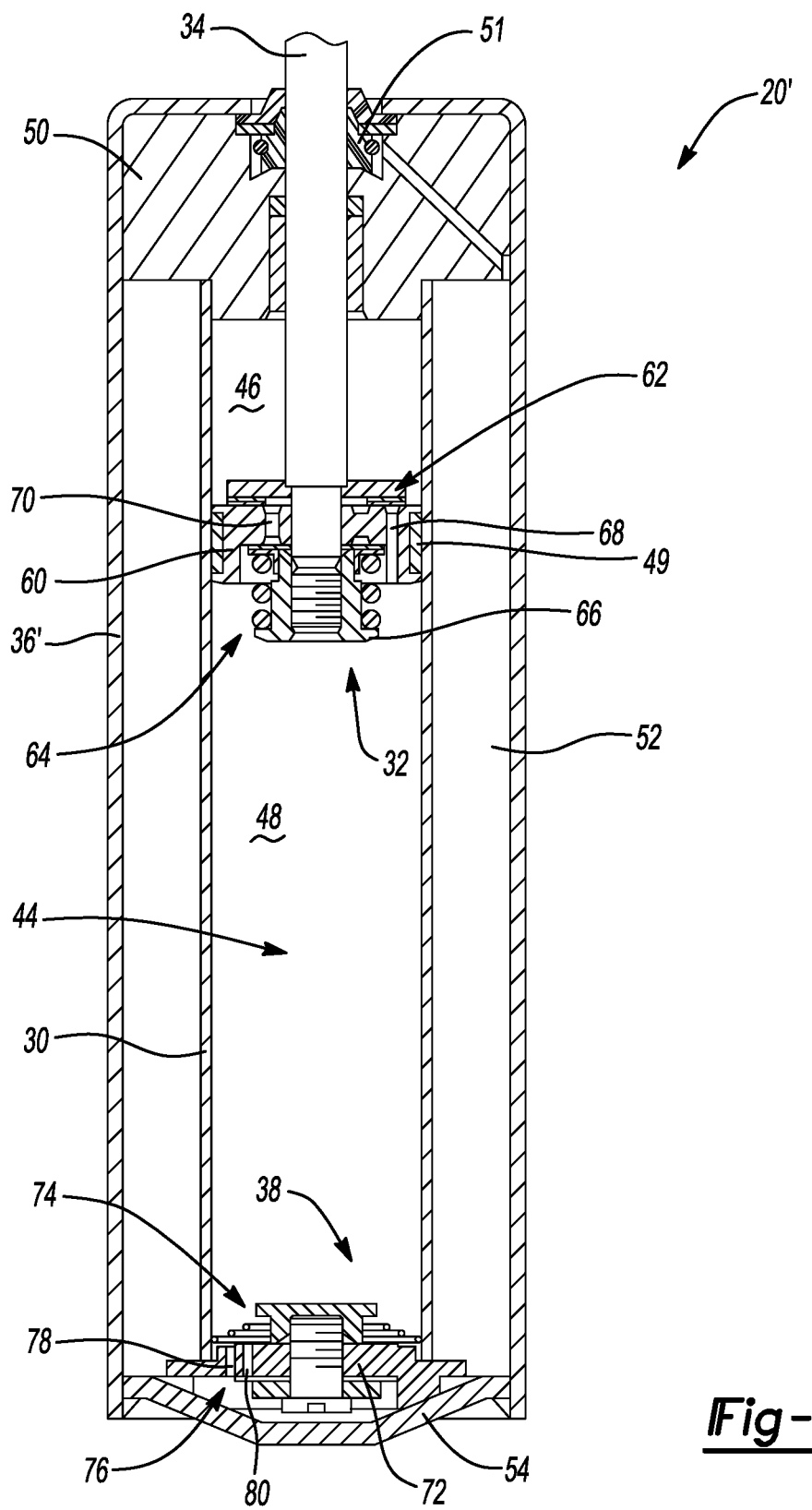
FIG. 3 is a side cross-sectional view of another exemplary shock absorber constructed in accordance with the present disclosure.

FIG. 3 illustrates another shock absorber 20' where the control valve 42 of shock absorber 20 has been deleted. Shock absorber 20' is the same as shock absorber 20 and operates in the same way as described above, except that shock absorber 20' lacks the intermediate tube 40, control valve 42, and intermediate chamber 82 of shock absorber 20. As a result of these changes, the shock absorber 20' includes a reserve tube 36' that does not include the tubular extension 56 that houses the control valve 42 in shock absorber 20.

In accordance with the subject disclosure, the reserve tubes 36, 36' of shock absorbers 20 and 20' are constructed to have a clam-shell arrangement with various internal and external features. Examples of these configurations are shown in FIGS. 4-19.

Figure 4:
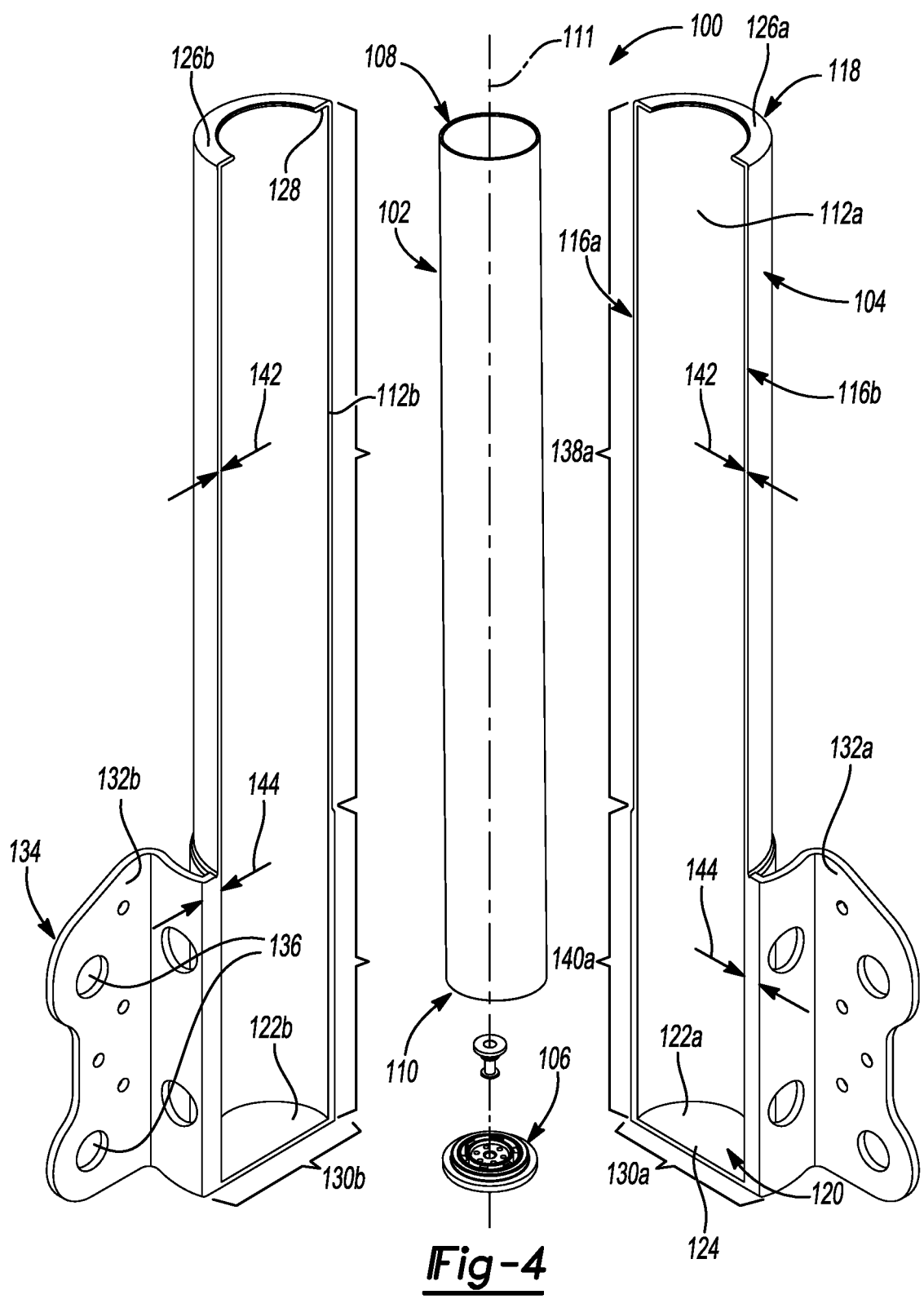
FIG. 4 is an exploded perspective view of an exemplary pressure tube, reserve tube, and base valve sub-assembly constructed in accordance with the present disclosure.
Figure 5:
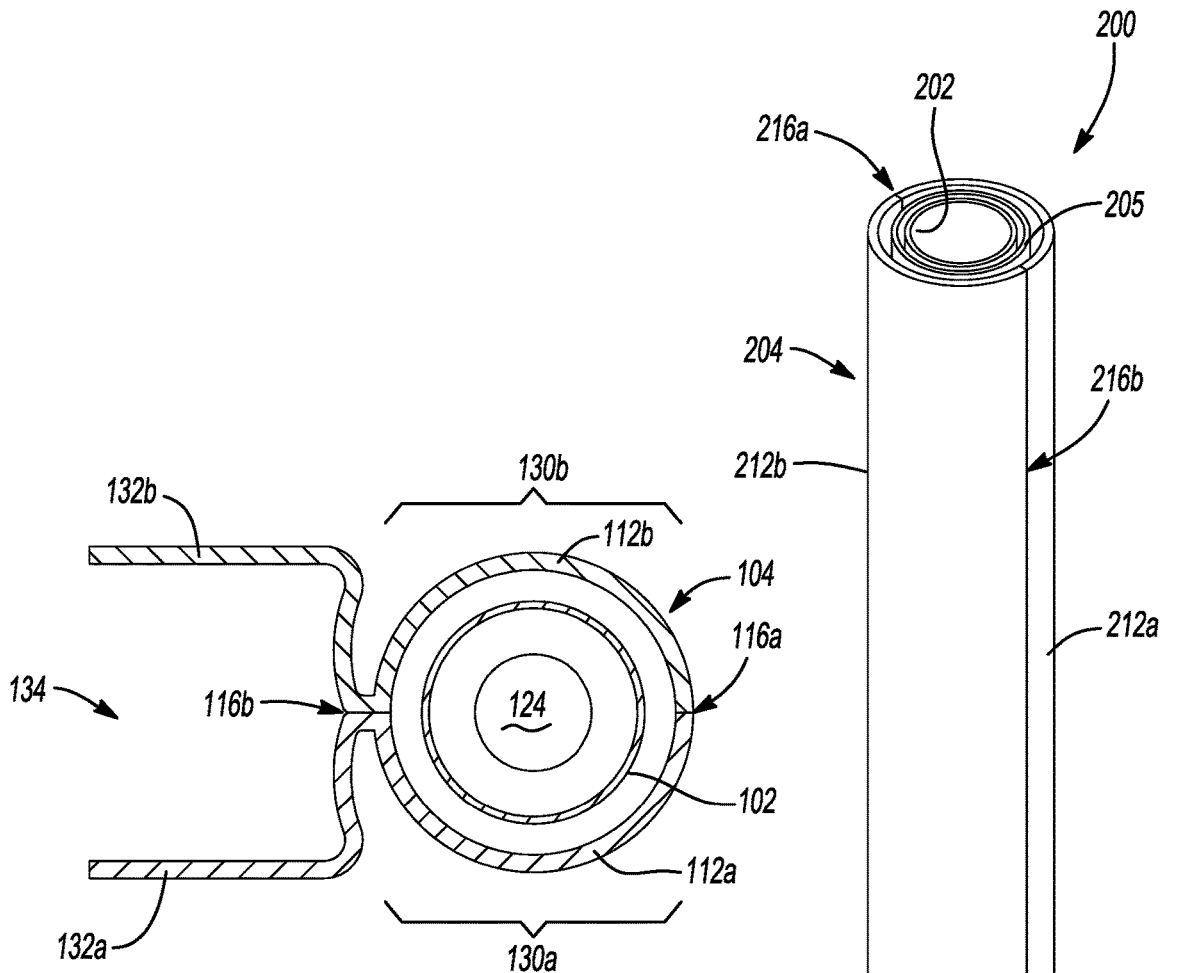
FIG. 5 is a top cross-sectional view of the pressure tube and reserve tube illustrated in FIG. 4.
Figure 6:
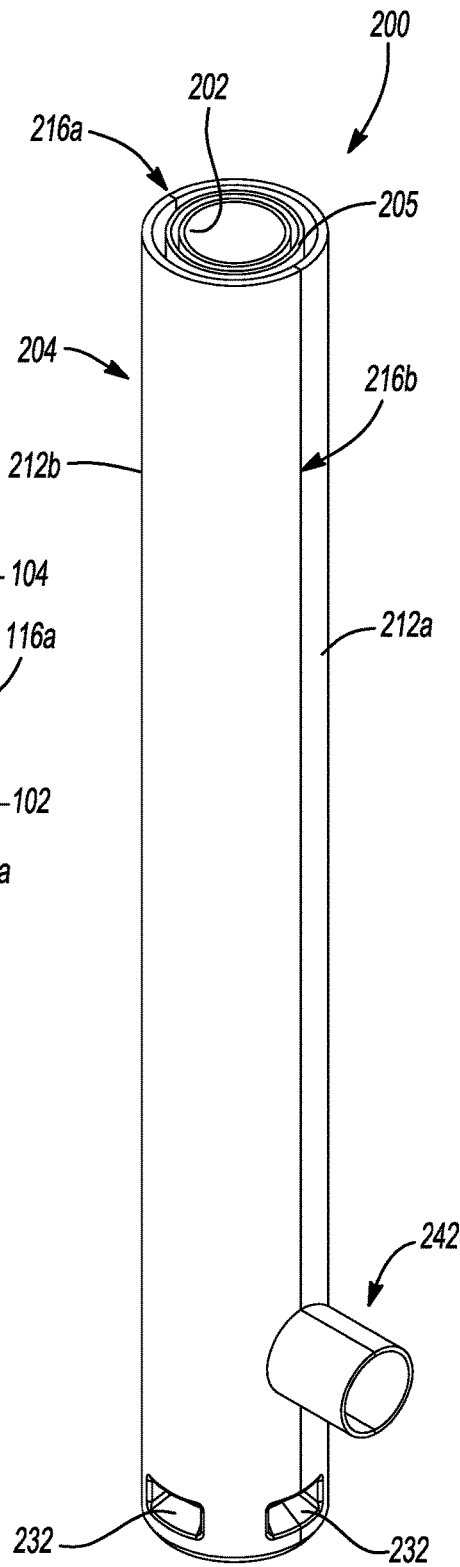
FIG. 6 is a front perspective view of an exemplary pressure tube, intermediate tube, reserve tube, and base valve sub-assembly constructed in accordance with the present disclosure.
Figure 7:
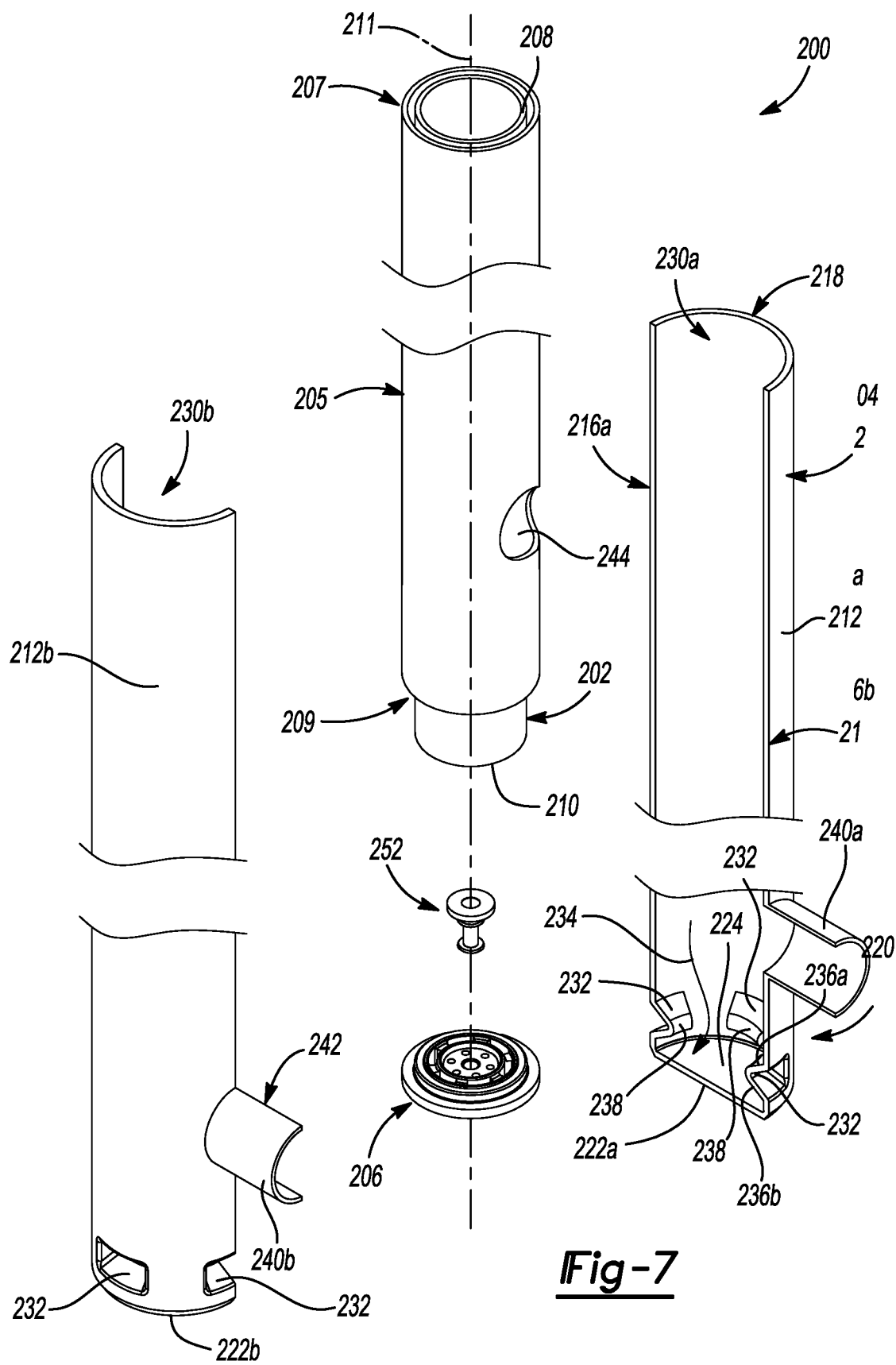
FIG. 7 is an exploded perspective view of the pressure tube, intermediate tube, reserve tube, and base valve sub-assembly illustrated in FIG. 6.
Figure 8:
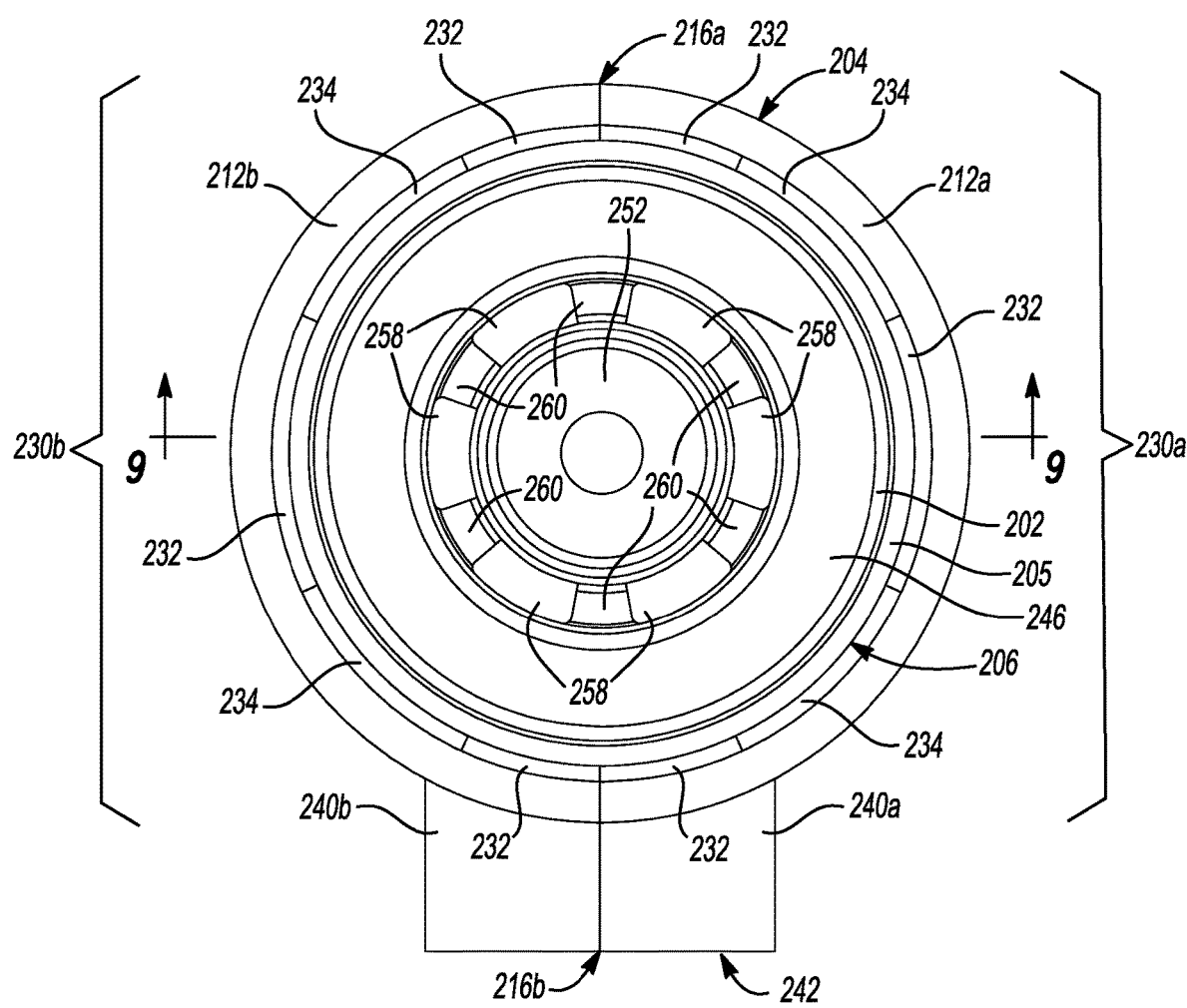
FIG. 8 is a top cross-sectional view of the reserve tube and the base valve illustrated in FIG. 6.
Figure 9:
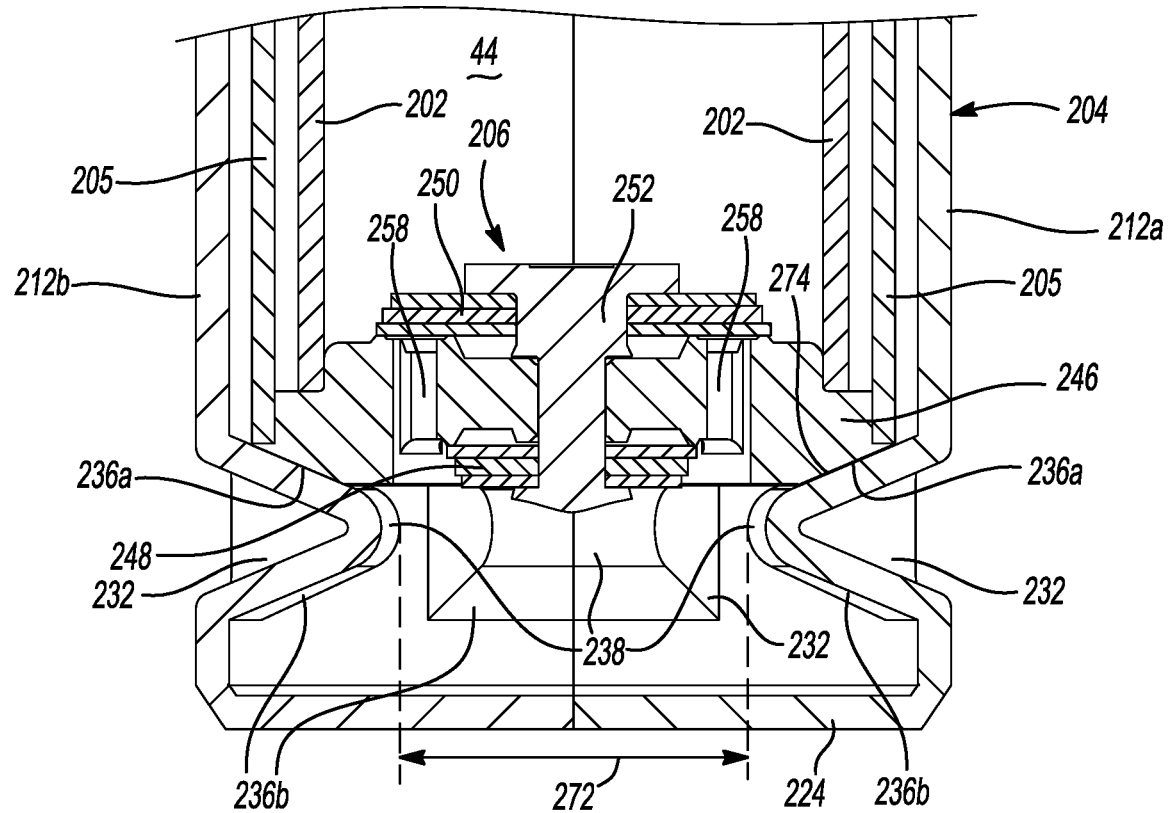
FIG. 9 is an enlarged side cross-sectional view of a portion of the pressure tube, intermediate tube, reserve tube, and base valve sub-assembly illustrated in FIG. 6.
Figure 10:
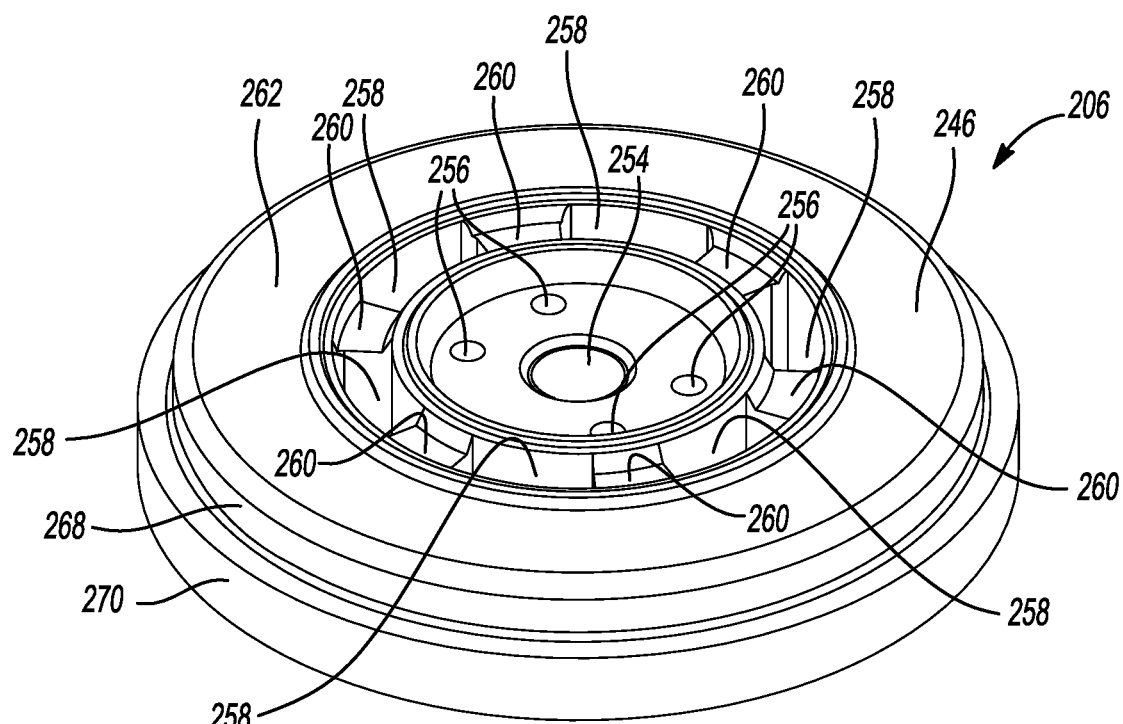
FIG. 10 is a top perspective view of the base valve illustrated in FIG. 6.
Figure 11:
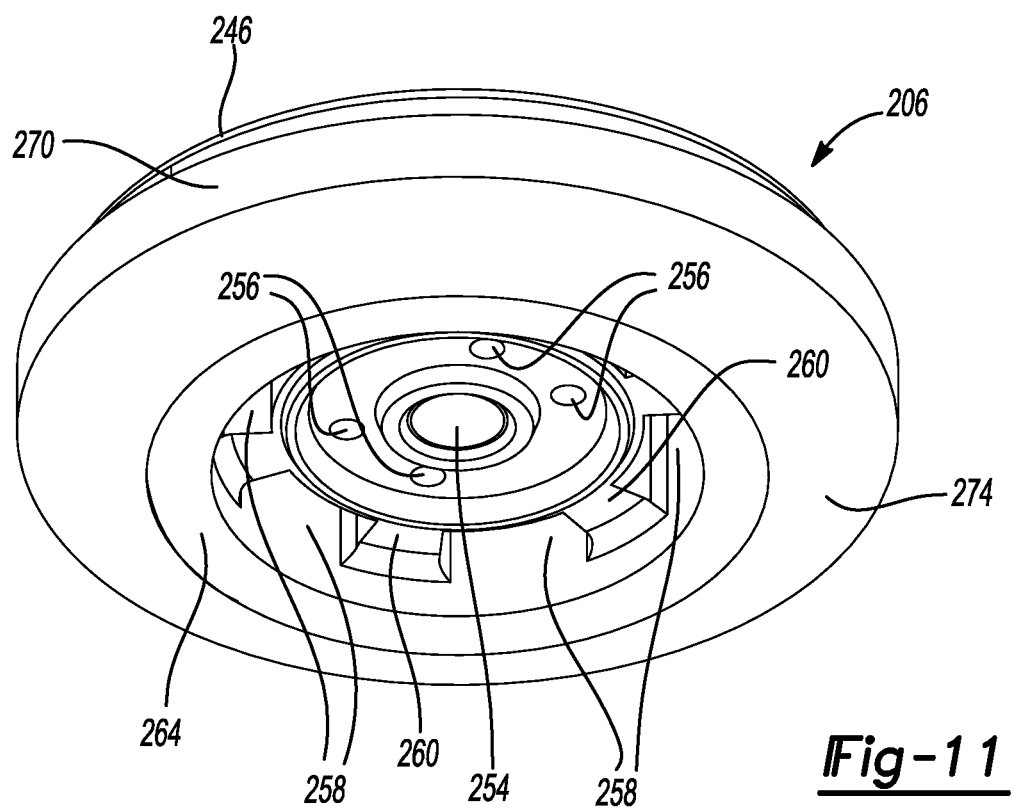
FIG. 11 is a bottom perspective view of the base valve illustrated in FIG. 6.
Figure 14:
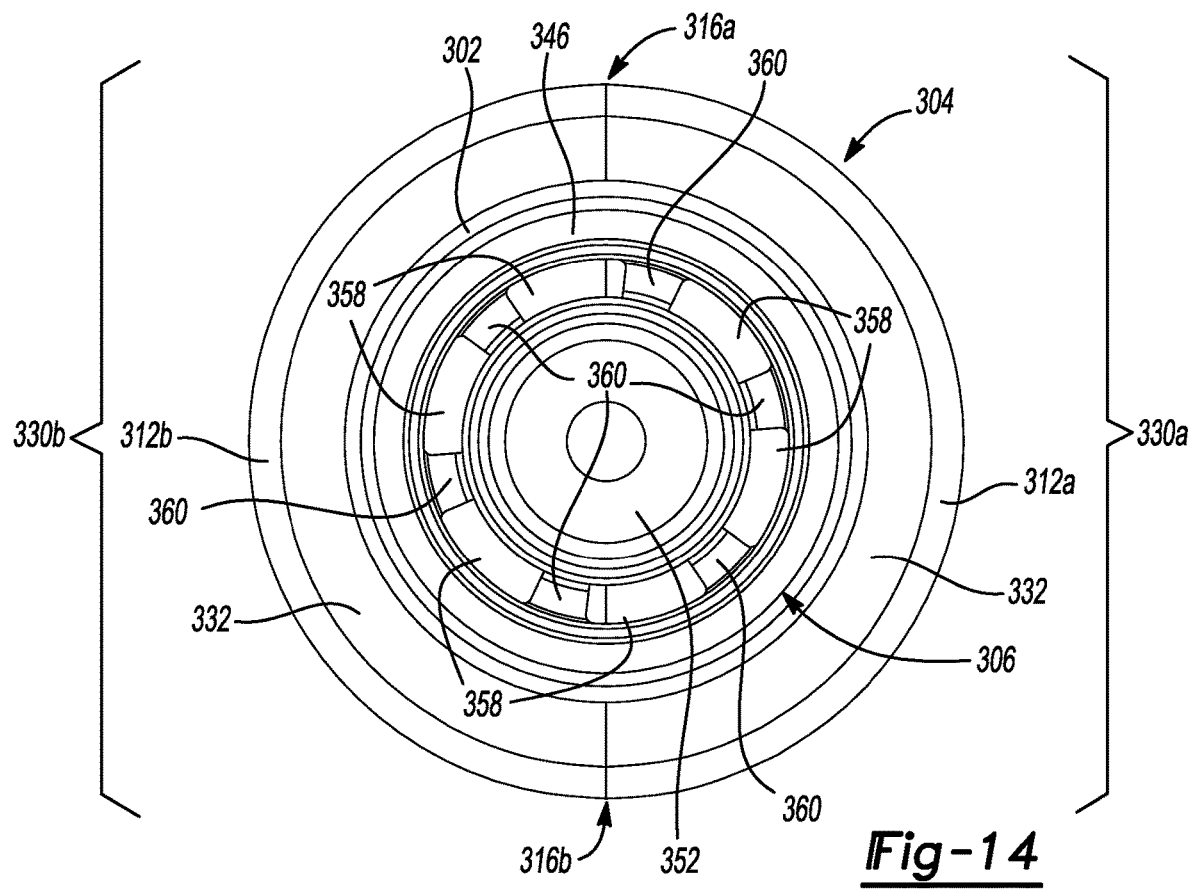
FIG. 14 is a top cross-sectional view of the reserve tube and the base valve illustrated in FIG. 12.
Figure 15:
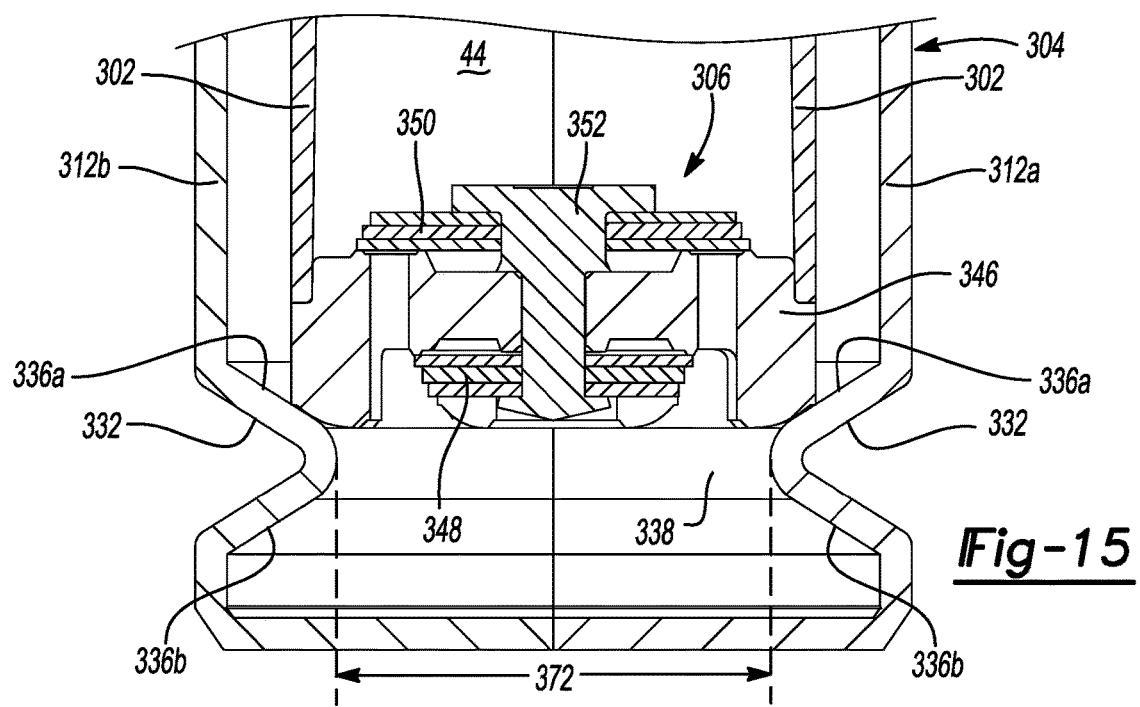
FIG. 15 is an enlarged side cross-sectional view of a portion of the pressure tube, reserve tube, and base valve sub-assembly illustrated in FIG. 12.
Figure 16:
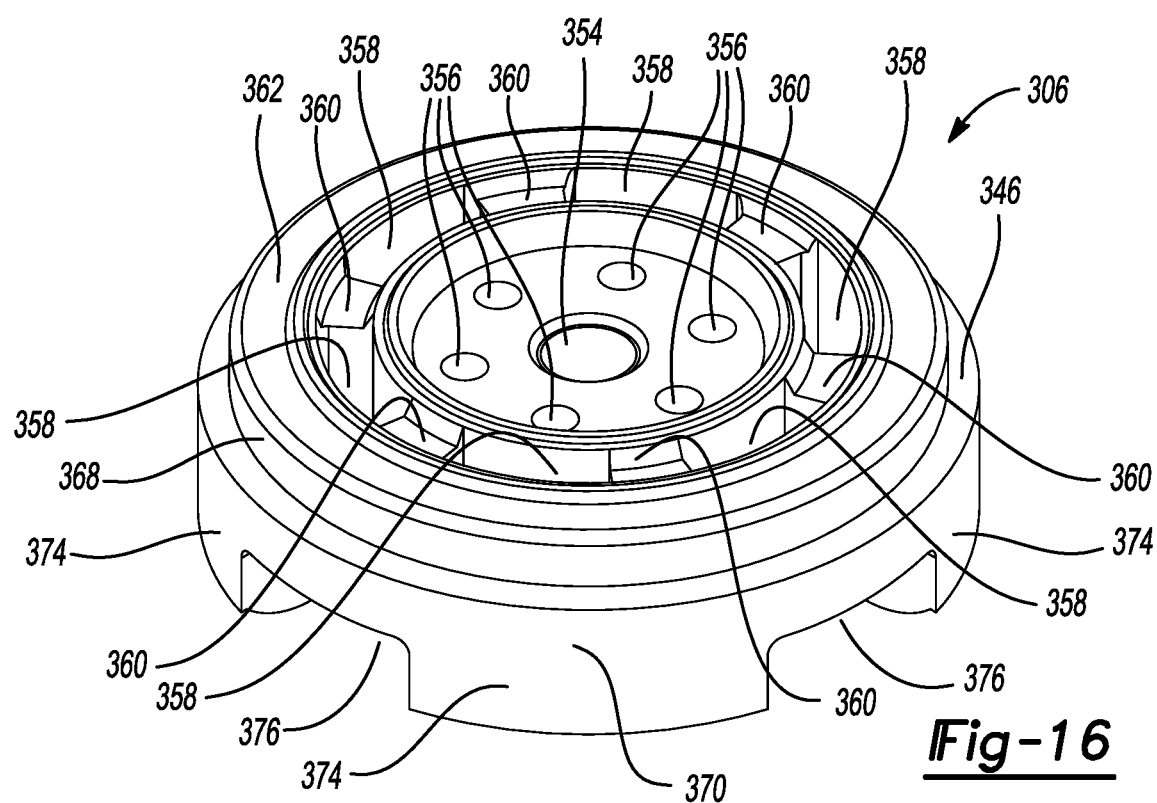
FIG. 16 is a top perspective view of the base valve illustrated in FIG. 12.
Figure 17:
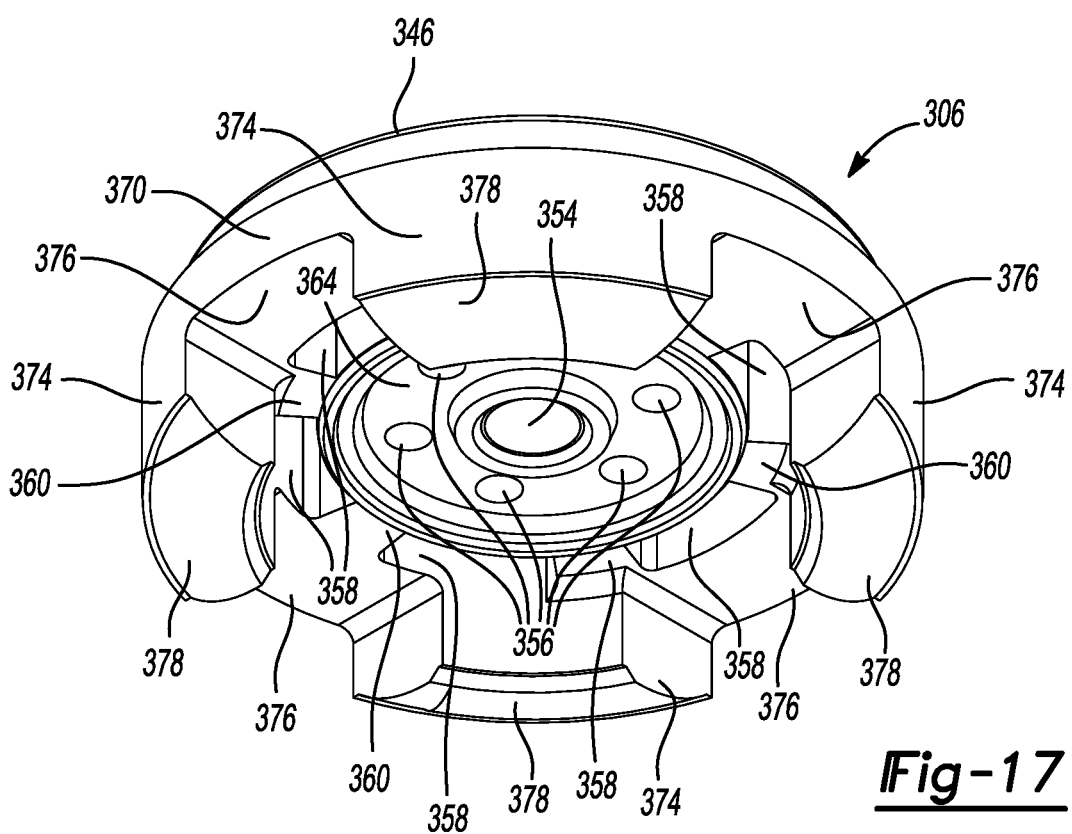
FIG. 17 is a bottom perspective view of the base valve illustrated in FIG. 12.

With reference to FIGS. 4 and 5, a shock absorber sub-assembly 100 is shown including a pressure tube 102, a reserve tube 104, and a base valve 106. The pressure tube 102 extends co-axially along a longitudinal axis 111 between an upper end 108 and a lower end 110. The upper end 108 of the pressure tube 102 is configured to mate with the upper rod guide assembly 50 of the shock absorber 20' shown in FIG. 3 and the base valve 106 is press-fit into the lower end 110 of the pressure tube 102. The reserve tube 104 is formed of a first open shell 112a and a second open shell 112b that come together in a clam-shell arrangement to surround the pressure tube 102 and the base valve 106. As a result, the pressure tube 102 and the reserve tube 104 are concentrically arranged about the longitudinal axis 111.

In the illustrated example, the first open shell 112a and the second open shell 112b are joined together at two longitudinally extending seams 116a, 116b that run parallel to the longitudinal axis 111. The first and second open shells 112a, 112b can be attached at the seams 116a, 116b in a number of different ways. By way of example and without limitation, the first open shell 112a may be welded to the second open shell 112b along the longitudinally extending seams 116a, 116b.

The reserve tube 104 extends longitudinally between a first end 118 and a second end 120. The first open shell 112a includes a first flange 122a and the second open shell 112b includes a second flange 122b. The first and second flanges 122a, 122b are fixed to one another to define an end wall 124 at the second end 120 of the reserve tube 104. The end wall 124 is concave or cupped to help center and support the lower end 110 of the pressure tube 102 and the base valve 106 in the reserve tube 104. The first open shell 112a also includes a third flange 126a and the second open shell 112b includes a fourth flange 126b. The third and fourth flanges 126a, 126b cooperate with one another to define an annular lip 128 at the first end 118 of the reserve tube 104. The annular lip 128 is configured to retain the upper rod guide assembly 50 of the shock absorber 20' shown in FIG. 3, which extends longitudinally between the annular lip 128 of the reserve tube 104 and the upper end 108 of the pressure tube 102.

The first open shell 112a and the second open shell 112b each include a semi-cylindrically shaped portion 130a, 130b and a planar portion 132a, 132b. The semi-cylindrically shaped portions 130a, 130b are fixed to one another to define a tube. In the illustrated embodiment, each of the semi-cylindrically shaped portions 130a, 130b of the first open shell 112a and the second open shell 112b extend in an arch that spans approximately 180 degrees such that the first and second open shells 112a, 112b are mirror images of one another and form approximately half (i.e., 50 percent) of the reserve tube 104. However, it should be appreciated that other configurations are possible where one of the first and second open shells 112a, 112b forms more than 50 percent of the reserve tube 104 and the other one of the first and second open shells 112a, 112b forms less than 50 percent of the reserve tube 104.

The planar portions 132a, 132b of the first and second open shells 112a, 112b cooperate to define a mounting bracket 134 in the shape of a clevis for coupling the reserve tube 104 to the unsprung portion of the vehicle 10. However, it should be appreciated that shock absorbers 20, 20' could be mounted in a reversed orientation where the mounting bracket 134 couples the reserve tube 104 to the body 16 of the vehicle 10. Each of the planar portions 132a, 132b may include one or more mounting holes 136 configured to receive fasteners such as bolts (not shown).

The first open shell 112a and the second open shell 112b each includes a first portion 138a, 138b and a second portion 140a, 140b. The planar portions 132a, 132b are part of the second portion 140a, 140b of the first and second open shells 112a, 112b and the first portion 138a, 138b of the first and second open shells 112a, 112b extends longitudinally between the second portions 140a, 140b and the first end 118 of the reserve tube 104. In the illustrated example, the first portion 138a, 138b of the first and second open shells 112a, 112b has a first thickness 142 and the second portion 140a, 140b of the first and second open shells 112a, 112b has a second thickness 144 that is greater than the first thickness 142. This increases the strength of the reserve tube 104 in the region of the mounting bracket 134.

With reference to FIGS. 6-11, another shock absorber sub-assembly 200 is shown, which includes a pressure tube 202, a reserve tube 204, an intermediate tube 205, and a base valve 206. The pressure tube 202 extends co-axially along a longitudinal axis 211 between an upper end 208 and a lower end 210. The intermediate tube 205 extends co-axially about the pressure tube 202 and longitudinally between a rod-side end 207 and a valve-side end 209. The upper end 208 of the pressure tube 202 and the rod-side end 207 of the intermediate tube 205 are configured to mate with the upper rod guide assembly 50 of the shock absorber 20 shown in FIG. 2. The base valve 206 is press-fit into the lower end 210 of the pressure tube 202 and the valve-side end 209 of the intermediate tube 205. The reserve tube 204 is formed of a first open shell 212a and a second open shell 212b that come together in a clam-shell arrangement to surround the pressure tube 202, intermediate tube 205, and the base valve 206. As a result, the pressure tube 202, the intermediate tube 205, and the reserve tube 204 are concentrically arranged about the longitudinal axis 211.

In the illustrated example, the first open shell 212a and the second open shell 212b are joined together at two longitudinally extending seams 216a, 216b that run parallel to the longitudinal axis 211. The first and second open shells 212a, 212b can be attached at the seams 216a, 216b in a number of different ways. By way of example and without limitation, the first open shell 212a may be welded to the second open shell 212b along the longitudinally extending seams 216a, 216b.

The reserve tube 204 extends longitudinally between a first end 218 and a second end 220. The first open shell 212a includes a first flange 222a and the second open shell 212b includes a second flange 222b. The first and second flanges 222a, 222b are fixed to one another to define an end wall 224 at the second end 220 of the reserve tube 204.

The first open shell 212a and the second open shell 212b each include a semi-cylindrically shaped portion 230a, 230b. The semi-cylindrically shaped portions 230a, 230b are fixed to one another to define a tube. In the illustrated embodiment, each of the semi-cylindrically shaped portions 230a, 230b of the first open shell 212a and the second open shell 212b extend in an arch that spans approximately 180 degrees such that the first and second open shells 212a, 212b are mirror images of one another and form approximately half (i.e., 50 percent) of the reserve tube 204. However, it should be appreciated that other configurations are possible where one of the first and second open shells 212a, 212b forms more than 50 percent of the reserve tube 204 and the other one of the first and second open shells 212a, 212b forms less than 50 percent of the reserve tube 204.

Each of the first and second open shells 212a, 212b includes one or more protrusions 232 that extend radially inwardly towards the longitudinal axis 211. The protrusions 232 are circumferentially spaced from one another such that fluid flow channels 234 are defined between the spaced apart protrusions 232. Each protrusion 232 has first and second sloped surfaces 236a, 236b that converge at an inside edge 238 that is rounded in the illustrated example. The first sloped surfaces 236a of the protrusions 232 directly engage the base valve 206 and support the base valve 206 within the reserve tube 204 at a position that is longitudinally spaced from the end wall 224 of the reserve tube 204.

Each of the first and second open shells 112a, 112b includes a semi-cylindrical projection 240a, 240b that extends radially outwardly away from the longitudinal axis 211 at a position adjacent to one of the seams 216a, 216b. When the first and second open shells 112a, 112b are joined together, the semi-cylindrical projections 240a, 240b cooperate to form a tubular extension 242 that is configured to receive the control valve 42 shown in FIG. 2. The intermediate tube 205 includes a through-hole 244 that is aligned with the tubular extension 242 such that the through-hole 244 can be connected in fluid communication with the control valve 42 shown in FIG. 2.

The base valve 206 includes a base valve disc 246, a compression disc stack 248, an extension disc stack 250, and a valve pin 252. The base valve disc 246 includes a valve pin hole 254, a plurality of compression passages 256, and a plurality of extension passages 258 that are positioned circumferentially between a plurality of valve disc legs 260. The valve pin hole 254 receives the valve pin 252, which retains the compression disc stack 248 and the extension disc stack 250 on the base valve disc 246. The base valve disc 246 has a proximal face 262 that faces the lower working chamber 44 and a distal face 264 that faces the end wall 224 of the reserve tube 204. The extension disc stack 250 is positioned over at least part of the proximal face 262 of the base valve disc 246 to control fluid flow through the extension passages 258. The compression disc stack 248 is positioned over at least part of the distal face 264 of the base valve disc 246 to control fluid flow through the compression passages 256.

The proximal face 262 of the base valve disc 246 includes an annular shoulder 268 that is configured to be inserted into the lower end 210 of the pressure tube 202 in a press-fit. The base valve disc 246 includes an outer diameter 270 that is configured to be inserted into the valve-side end 209 of the intermediate tube 205 in a press-fit. The inside edges 238 of the protrusions 232 in the reserve tube 204 define an inside diameter 272 that is smaller than the outer diameter 270 of the base valve disc 246 and the distal face 264 of the base valve disc 246 includes a taper 274 that is configured to abut the first sloped surfaces 236a of the protrusions 232. Accordingly, the protrusions 232 support the base valve 206 in a centrally aligned position in the reserve tube 204.

With reference to FIGS. 12-17, another shock absorber sub-assembly 300 is shown, which includes a pressure tube 302, a reserve tube 304, and a base valve 306. The pressure tube 302 extends co-axially along a longitudinal axis 311 between an upper end 308 and a lower end 310. The upper end 308 of the pressure tube 302 is configured to mate with the upper rod guide assembly 50 of the shock absorber 20' shown in FIG. 3. The base valve 306 is press-fit into the lower end 310 of the pressure tube 302. The reserve tube 304 is formed of a first open shell 312a and a second open shell 312b that come together in a clam-shell arrangement to surround the pressure tube 302 and the base valve 306. As a result, the pressure tube 302 and the reserve tube 304 are concentrically arranged about the longitudinal axis 311.

In the illustrated example, the first open shell 312a and the second open shell 312b are joined together at two longitudinally extending seams 316a, 316b that run parallel to the longitudinal axis 311. The first and second open shells 312a, 312b can be attached at the seams 316a, 316b in a number of different ways. By way of example and without limitation, the first open shell 312a may be welded to the second open shell 312b along the longitudinally extending seams 316a, 316b.

The reserve tube 304 extends longitudinally between a first end 318 and a second end 320. The first open shell 312a includes a first flange 322a and the second open shell 312b includes a second flange 322b. The first and second flanges 322a, 322b are fixed to one another to define an end wall 324 at the second end 320 of the reserve tube 304.

The first open shell 312a and the second open shell 312b each include a semi-cylindrically shaped portion 330a, 330b. The semi-cylindrically shaped portions 330a, 330b are fixed to one another to define a tube. In the illustrated embodiment, each of the semi-cylindrically shaped portions 330a, 330b of the first open shell 312a and the second open shell 312b extend in an arch that spans approximately 180 degrees such that the first and second open shells 312a, 312b form approximately half (i.e., 50 percent) of the reserve tube 304. However, it should be appreciated that other configurations are possible where one of the first and second open shells 312a, 312b forms more than 50 percent of the reserve tube 304 and the other one of the first and second open shells 312a, 312b forms less than 50 percent of the reserve tube 304. Optionally, one of the first and second open shells 312a, 312b may include a tire dent 331. In the example illustrated in FIGS. 12-17, the tire dent 331 is a depression, which is stamped in the second open shell 312b. The tire dent 331 is longitudinally positioned at a location that is aligned with the sidewall of a tire mounted on one of the wheels 18, 24 of the vehicle 10 to provide improved clearance between the tire and the reserve tube 304. It should be appreciated that the tire dent 331 is easier to manufacture because the reserve tube 304 is formed of first and second open shells 312a, 312b instead of a pre-formed tube. The tire dent 331 can be formed during the same stamping operation that forms the first and second open shells 312a, 312b, therefore eliminating the need for a separate manufacturing step for forming the tire dent 331.

Each of the first and second open shells 312a, 312b includes an arcuate protrusion 332 that extends radially inwardly towards the longitudinal axis 311. The arcuate protrusions 332 cooperate to form a continuous annular depression 334 that extends 360 degrees around the reserve tube 304. Each arcuate protrusion 332 has first and second sloped surfaces 336a, 336b that converge at an inside edge 338 that is rounded in the illustrated example. The first sloped surfaces 336a of the arcuate protrusions 332 directly engage the base valve 306 and support the base valve 306 within the reserve tube 304 at a position that is longitudinally spaced from the end wall 324 of the reserve tube 304.

The base valve 306 includes a base valve disc 346, a compression disc stack 348, an extension disc stack 350, and a valve pin 352. The base valve disc 346 includes a valve pin hole 354, a plurality of compression passages 356, and a plurality of extension passages 358 that are positioned circumferentially between a plurality of valve disc legs 360. The valve pin hole 354 receives the valve pin 352, which retains the compression disc stack 348 and the extension disc stack 350 on the base valve disc 346. The base valve disc 346 has a proximal face 362 that faces the lower working chamber 44 and a distal face 364 that faces the end wall 324 of the reserve tube 304. The extension disc stack 350 is positioned over at least part of the proximal face 362 of the base valve disc 346 to control fluid flow through the extension passages 358. The compression disc stack 348 is positioned over at least part of the distal face 364 of the base valve disc 346 to control fluid flow through the compression passages 356.

The proximal face 362 of the base valve disc 346 includes an annular shoulder 368 that is configured to be inserted into the lower end 310 of the pressure tube 302 in a press-fit. The base valve disc 346 includes an outer diameter 370 and the inside edges 338 of the arcuate protrusions 332 in the reserve tube 304 define an inside diameter 372 that is smaller than the outer diameter 370 of the base valve disc 346. The distal face 364 of the base valve disc 246 includes a plurality of longitudinal legs 374 that extend longitudinally toward the end wall 324 of the reserve tube 304. The plurality of longitudinal legs 374 are circumferentially spaced by channels 376. The longitudinal legs 374 have tapered ends 378 that are configured to abut the first sloped surfaces 336a of the arcuate protrusions 332. Accordingly, the arcuate protrusions 332 support the base valve 306 in a centrally aligned position in the reserve tube 304.

The number, radial thickness, and circumferential width of the longitudinal legs 374 can vary depending on the desired fluid flowrate through the channels 376 and the amount of pre-load applied to the base valve disc 346 during assembly of the shock absorber sub-assembly 300. For example, a preload of 10-15 kilo-Newtons (kN) may be applied to the base valve disc 346 when the pressure tube 302 is installed in the reserve tube 304. The base valve disc 346 must be designed such that the longitudinal legs 374 do not break under the pre-load force.

The shock absorber sub-assemblies 100, 200, 300 described above can be manufactured according to the exemplary method set forth below.

The method includes the steps of: obtaining a pressure tube 102, 202, 302, slidably positioning a piston assembly 32 within the pressure tube 102, 202, 302, forming a first open shell 112a, 212a, 312a from a first metal sheet, forming a second open shell 112b, 212b, 312b from a second metal sheet, and positioning the first open shell 112a, 212a, 312a and the second open shell 112b, 212b, 312b around the pressure tube 102, 202, 302. The method proceeds with the steps of aligning the first open shell 112a, 212a, 312a with the second open shell 112b, 212b, 312b, welding the first open shell 112a, 212a, 312a to the second open shell 112b, 212b, 312b to sealingly join the first open shell 112a, 212a, 312a to the second open shell 112b, 212b, 312b and thereby define a reserve tube 104, 204, 304, and coupling the reserve tube 104, 204, 304 to the pressure tube 102, 202, 302.

As noted above, reserve tubes 202 and 302 include a substantially cylindrically-shaped portion 230a, 230b, 230a, 230b and one or more protrusions 232, 332. The protrusions 232, 332 are at least partially defined by one of the first sheet and the second sheet. In accordance with the method described above, the step of positioning the first open shell 112a, 212a, 312a and the second open shell 112b, 212b, 312b occurs before the welding step. The method may also include the step of positioning a base valve 106, 206, 306 between the first open shell 112a, 212a, 312a and the second open shell 112b, 212b, 312b prior to the step of welding the first open shell 112a, 212a, 312a to the second open shell 112b, 212b, 312b. In accordance with this step of the method, the one or more protrusions 232, 332 at least partially retain the base valve 206, 306 within the reserve tube 104, 204, 304.

Figure 18:
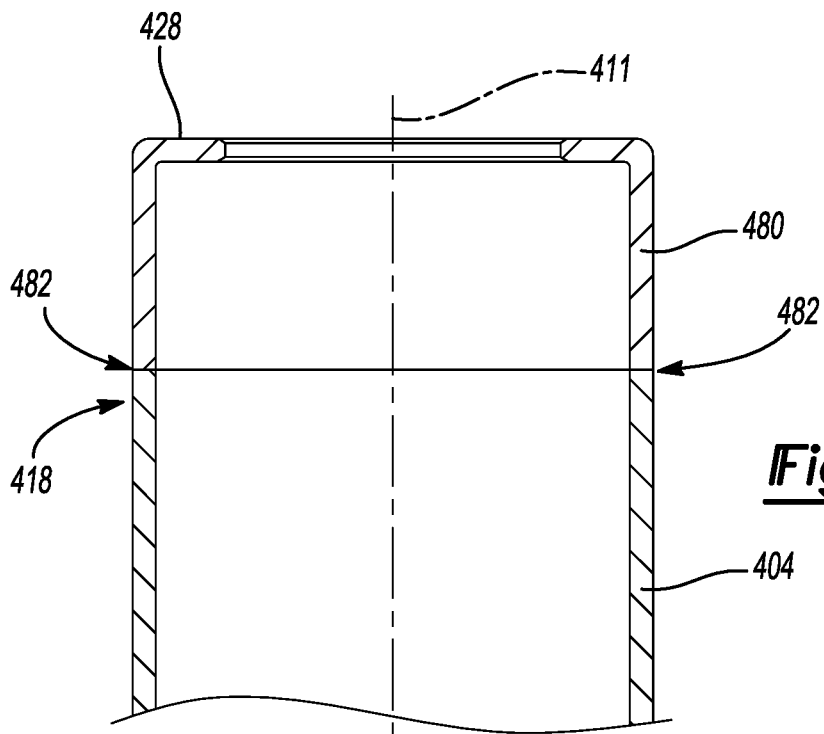
FIG. 18 is a side cross-sectional view of a portion of an exemplary reserve tube constructed in accordance with the present disclosure.
Figure 19:
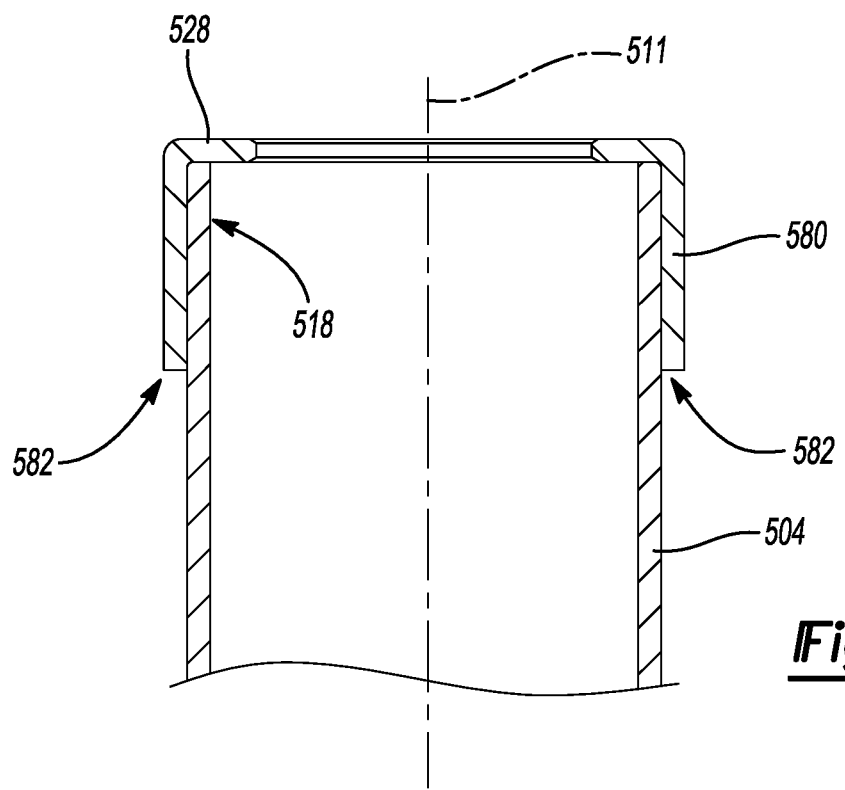
FIG. 19 is a side cross-sectional view of a portion of another exemplary reserve tube constructed in accordance with the present disclosure.

The annular lip 128, 228, 328 at the first end 118, 218, 318 of the reserve tube 104, 204, 304 may be manufactured in a number of different ways. In the example shown in FIGS. 3 and 4, the annular lip 128 is formed by flanges 126a, 126b, which may be stamped or otherwise formed in the first and second open shells 112a, 112b. FIGS. 18 and 19 illustrate other examples, where annular lips 428, 528 are formed by the method steps of fixing a tubular sleeve 480, 580 to a first end 418, 518 of reserve tubes 404, 504 and mechanically deforming a portion of the tubular sleeve 480, 580 to define the annular lips 428, 528 at the first end 418, 518 of the reserve tubes 404, 504. The mechanical deformation process used in the method step described above can be a process called spinning, where the tubular sleeve 480, 580 is pushed longitudinally against an angled die while the tubular sleeve 480, 580 is being rotated about longitudinal axis 411, 511 to bend a portion of the tubular sleeve 480, 580 inward to form the annular lip 428, 528. If the spinning process were applied to the first end 118 of the reserve tube 104 shown in FIGS. 3 and 4 to create the annular lip 128, the welds at seams 116a, 116b may break. By attaching a tubular sleeve 480, 580 to the first end 418, 518 of the reserve tubes 404, 504 shown in FIGS. 18 and 19, the spinning process can be used without endangering the integrity of the welded seams. In FIG. 18, the tubular sleeve 480 is welded to the first end 418 of the reserve tube 404 at joint 482. In FIG. 19, the tubular sleeve 580 is configured to overlay the first end 518 of the reserve tube 504 and is welded to the reserve tube 504 at location 582.

Advantageously, constructing the reserve tubes 104, 204, 304 from first and second open shells 112a, 112b, 212a, 212b, 312a, 312b instead of from a drawn tube provides great flexibility to apply various internal and external features to the reserve tubes 104, 204, 304 in a more precise and less costly manner that is easier to manufacture and that requires less welding. In accordance with the method described above, the first and second open shells 112a, 112b, 212a, 212b, 312a, 312b are created from the first and second metal sheets. The first metal sheet may be a mirror image of the second metal sheet and may have a peripheral shape that is not rectangular.

Figure 20A:
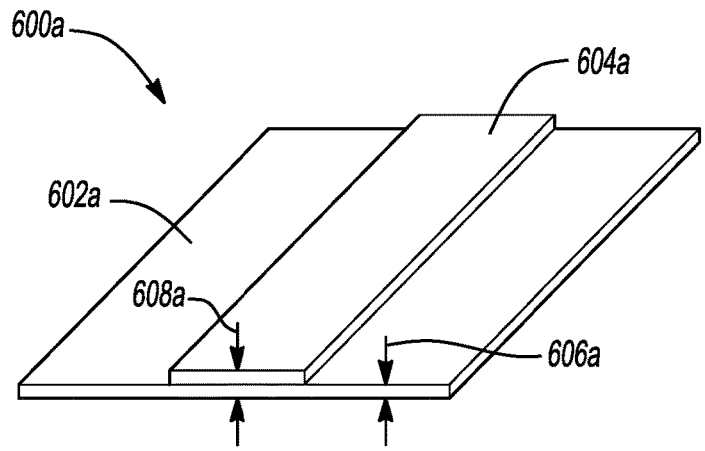
FIG. 20A is a top perspective view illustrating an exemplary patchwork blank.
Figure 20B:
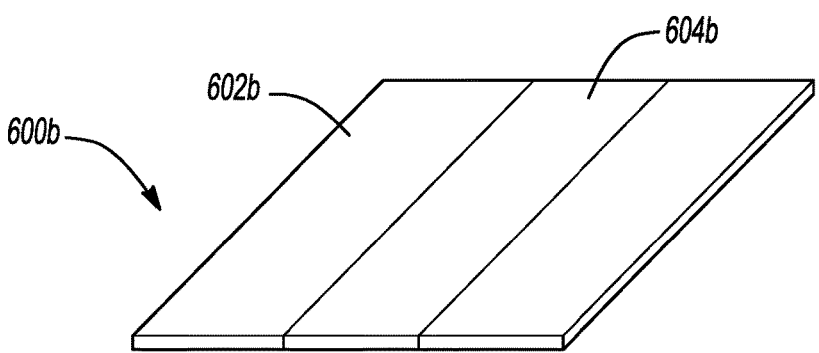
FIG. 20B is a top perspective view illustrating an exemplary tailor welded blank.
Figure 20C:
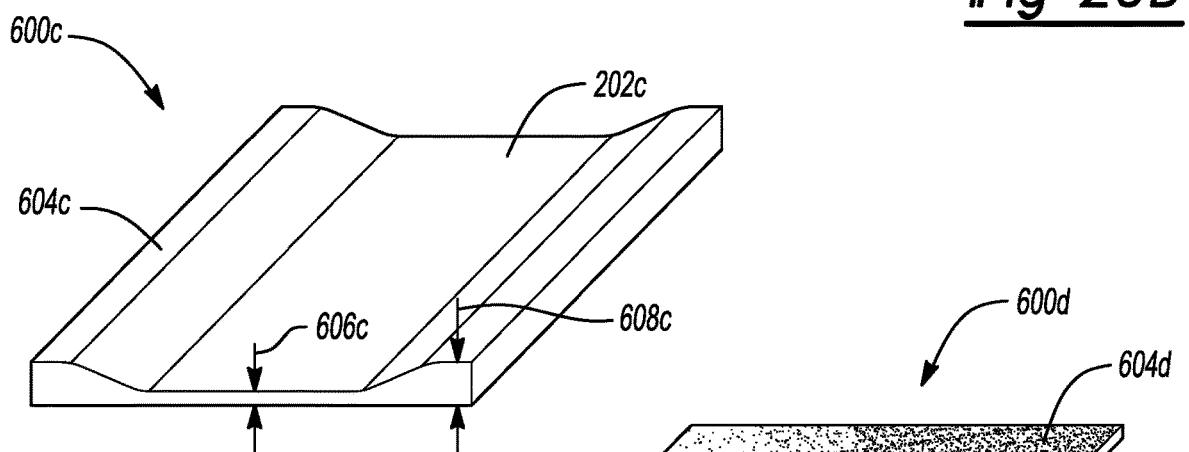
FIG. 20C is a top perspective view illustrating an exemplary tailor rolled blank.
Figure 20D:
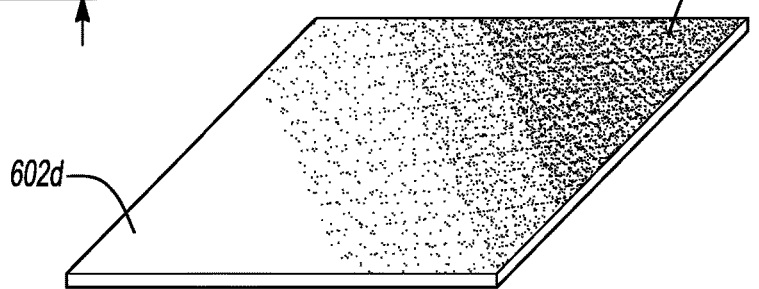
FIG. 20D is a top perspective view illustrating an exemplary tailor heat treated blank.

With reference to FIGS. 20A-D, the first and second metal sheets may be made from metal blanks 600a, 600b, 600c, 600d. With reference to FIG. 20A, each of the first and second metal sheets may comprise a patchwork blank 600a, which includes a first portion 602a having a first set of mechanical properties and a second portion 604a having a second set of mechanical properties that are different than the first set of mechanical properties. For example, the first portion 602a has a first thickness 606a that is different than a second thickness 608a of the second portion 604a, which is greater than the first thickness 606a. In another example shown in FIG. 20B, each of the first and second metal sheets may comprise a tailor welded blank 600b, which includes a first portion 602a and a second portion 604b that are made from different materials and/or have different thicknesses. In both of the examples shown in FIGS. 20A-B, the first portion 602a, 602b is manufactured individually and separately from the second portion 604a, 604b and subsequently joined to the second portion 604a, 604b by welding or another attachment mechanism. In another example shown in FIG. 20C, each of the first and second metal sheets may comprise a tailor rolled blank 600c, which includes a first portion 602c having a first thickness 606c and a second portion 604c having a second thickness 608c that is greater than the first thickness 606c. In accordance with this example, a rolling operation is used to give the first and second portions 602c, 604c of the tailor rolled blank 600c different thicknesses 606c, 608c and other mechanical properties. In another example shown in FIG. 20D, each of the first and second metal sheets may comprise a tailor heat treated blank 600d, which includes a first portion 602d and a second portion 604d that have been subjected to different levels of heat treatment to give the first portion 602d different mechanical properties (e.g., strength) compared to the second portion 604d.

The blanks 600a, 600b, 600c, 600d shown in FIGS. 20A-D can be used to create a variety of different features. By way of non-limiting example, the portions 140a, 140b of the reserve tube 104 adjacent the mounting bracket 134 shown in FIGS. 4 and 5 may be created using one of the blanks 600a, 600b, 600c shown in FIGS. 20A-C.

It should be appreciated that the first and second metal sheets described herein may be manufactured from ferrous or non-ferrous flat sheet metal in either blank or coil form. More specifically, the first and second open shells 112a, 112b, 212a, 212b, 312a, 312b may be formed by hydroforming using a pressurized media stamping (i.e., sheet hydroforming with a die (SHF-D) or sheet hydroforming with a punch (SHF-P)), stamping, rubber forming, incremental forming, or other similar sheet metal forming methods. This allows integration of attachment components such as a mounting bracket 134, a stabilization bracket, a foot, a spring seat, and a tubular extension 242 (i.e., an external valve housing) into the plastically deformed sheet metal forming the reserve tubes 104, 204, 304. This eliminates the need to manufacture tubes with external attachments as well as eliminating the need for multiple joining and welding operations. Manufacturing the reserve tubes 104, 204, 304 using first and second open shells 112a, 112b, 212a, 212b, 312a, 312b minimizes the sheet metal scrap generation, reduces the cycle time, and lowers the production cost.

Moreover, potential cost reduction is achieved since part complexity is shifted to the sheet manufacturing process (e.g., tooling and die costs).

The deformation of the blanks 600a, 600b, 600c, 600d can be carried out in a single forming operation or in multiple, simultaneous forming operations such as progressive stamping. The cutting of the deformed sheet metal parts can be integrated into the forming operation or can be done separately using laser, water jet, plasma, or other cutting operations. Value-added features like brackets and fasteners can be integrated into the plastically deformed sheets during the manufacture of the first and second open shells 112a, 112b, 212a, 212b, 312a, 312b.

By stamping or otherwise forming the one or more protrusions 232, 332 the first and second open shells 212a, 212b, 312a, 312b the pressure tubes 202, 302, base valves 206, 306, and/or intermediate tube 305 can be supported within the reserve tubes 204, 304. In this way, the manufacturing of the base cup/cap or hot closing of the reserve tube end can be eliminated. Instead, the top closing can be created during the shell forming process.

In accordance with the method described above, a welding process is selected that imparts a relatively small amount of heat to the reserve tubes 104, 204, 304 in order to reduce the possible distortion of the first and second open shells 112a, 112b, 212a, 212b, 312a, 312b. By way of non-limiting example, laser welding can be used. Tailored blanks 600a, 600b, 600c, 600d (e.g., sheets with different alloys, thicknesses, coatings or material properties) can be used as an initial blank for the sheet metal forming operations in order to achieve different mechanical properties (e.g., different strengths and stiffness) at different portions of the reserve tubes 104, 204, 304. For example, higher thickness is desired in the portion of the reserve tube 104 close to the mounting bracket 134 or at locations with high stress concentration (e.g., loop and tube attachment).

The forming/stamping operations described herein can take place at elevated temperatures for less ductile materials, such as high strength steel sheets, to improve formability and reduce spring-back. For example, sheet metal blank 600d can be locally softened (e.g., local annealing using laser or induction heating) in regions that require higher straining for formability enhancement.

Many other modifications and variations of the present disclosure are possible in light of the above teachings and may be practiced otherwise than as specifically described while within the scope of the appended claims. In addition, the steps of the method set forth above and in the appended claims may be practiced in parallel, sequentially, or in a different order than the order in which they are described herein without departing from the scope of the present disclosure.

What is claimed is:

1. A method of manufacturing a damper for a vehicle, the method comprising:
   obtaining a pressure tube;
   slidably positioning a piston assembly within the pressure tube;
   deforming a first metal sheet to define a first open shell with longitudinally spaced apart edges;
   deforming a second metal sheet to define a second open shell with longitudinally spaced apart edges;
   positioning the first open shell and the second open shell around the pressure tube;
   aligning the first open shell with the second open shell;
   welding the first open shell to the second open shell to sealingly join the first open shell to the second open shell and define a reserve tube, wherein the reserve tube includes a substantially cylindrically-shaped portion and a protrusion, wherein the protrusion is at least partially defined by one of the first metal sheet and the second metal sheet;

positioning a valve between the first open shell and the second open shell prior to welding the first open shell to the second open shell, wherein the protrusion at least partially retains the vavle; and coupling the reserve tube to the pressure tube.

2. The method of claim 1, wherein the positioning of the first open shell and the second open shell occurs before the welding.

3. The method of claim 1, wherein the reserve tube includes a longitudinal axis, the first open shell being welded to the second open shell along the longitudinal axis.

4. The method of claim 1, wherein the first metal sheet is a mirror image of the second metal sheet.

5. The method of claim 1, wherein the first metal sheet includes a peripheral shape that is not rectangular.

6. The method of claim 1, wherein the first metal sheet comprises a tailored blank including a first portion having a first set of mechanical properties and a second portion having a second set of mechanical properties different than the first set of mechanical properties.

7. The method of claim 6, wherein the first portion is manufactured individually and separately from the second portion and subsequently joined to the second portion.

8. The method of claim 6, further comprising manipulating the first portion to obtain a first thickness different than a second thickness of the second portion.

9. The method of claim 1, wherein the protrusion directly engages the valve within the reserve tube.

10. The method of claim 1, wherein the protrusion radially inwardly extends into the reserve tube.

11. The method of claim 1, further including fixing a tubular sleeve to a first end of the reserve tube.

12. The method of claim 11, further including mechanically deforming a portion of the tubular sleeve to define an annular lip at the first end of the reserve tube.

13. The method of claim 11, wherein the tubular sleeve overlays the first end of the reserve tube such that the tubular sleeve is positioned radially outward of the first end of the reserve tube in an abutting relationship.

14. The method of claim 1, wherein the step of forming the first open shell includes forming a first flange and the step of forming the second open shell includes forming a second flange, the first and second flanges being fixed to one another to define an end wall at a second end of the reserve tube.

15. The method of claim 14, wherein the step of forming the first open shell includes forming a third flange and the step of forming the second open shell includes forming a fourth flange, the third and fourth flanges being fixed to one another to define an annular lip at a first end of the reserve tube.

16. The method of claim 1, further including mechanically deforming the first and second open shells to define an annular lip at a first end of the reserve tube.

17. The method of claim 1, wherein the first open shell and the second open shell each include a semi-cylindrically shaped portion and wherein the protrusion forms a planar portion of the first open shell and a planar portion of the second open shell, the semi-cylindrically shaped portions being fixed to one another to define a tube, the planar portions cooperating to define a mounting bracket.

18. The method of claim 1, wherein the protrusion forms a tubular extension that extends radially outwardly from the reserve tube, the tubular extension receiving a control valve.

19. The method of claim 1, where the protrusion forms a tire dent positioned in at least one of the first and second open shells.

* * * * *